Jan. 24, 1961 W. W. FISHER 2,969,534

DIGITAL TRANSFORMER

Filed May 19, 1955 3 Sheets-Sheet 1

INVENTOR.

W. W. FISHER

BY

[signature]

ATTORNEY

DIGITAL TRANSFORMER

Filed May 19, 1955

INVENTOR.
W. W. FISHER
BY
[signature]
ATTORNEY

INVENTOR.
W. W. FISHER
BY [signature]
ATTORNEY 2,969,534
Patented Jan. 24, 1961

2,969,534

DIGITAL TRANSFORMER

Walter W. Fisher, Pacoima, Calif., assignor to The Bendix Corporation, a corporation of Delaware Filed May 19, 1955, Ser. No. 509,623
11 Claims. (Cl. 340—347)

This invention relates to electrical signaling and control systems employing binary code for the transmission of information.

An object of the invention is to directly translate binary code signals into A.C. potentials of related value.

Another object is to directly translate a binary code signal into a plurality of A.C. potentials corresponding to the output potentials of a synchro transmitter, for actuation of a synchro receiver into an angular position corresponding to a position represented by the binary code signal.

A feature of the invention is a digital power transformer having a plurality of output windings corresponding in number to the digits in a binary code, and digital switches responsive to binary code signals for connecting the windings to an output circuit in such relation as to deliver thereto A.C. potentials of magnitudes corresponding to the values of code signals.

Another feature of the invention is a relatively simple combination of digital transformers and digital switches responsive to a binary number system representing a plurality of angular positions for simulating the output potentials of a synchro transmitter in those angular positions.

Other more specific objects and features of the invention will appear from the description to follow.

The present invention comprises in its simplest form a power transformer having a plurality of secondary or output windings corresponding respectively to the different digits in a binary number and having potentials varying according to the geometric series A, 2A, 4A, 8A, etc. These windings are connected to an output or load circuit by a simple digital relay system in such fashion that the sum potential corresponds to the number represented by the code signal applied to the relays.

Different switching circuits are necessary for the additive or natural binary code, and the reflected or minimum error binary code, respectively, but the number of digital switches and the number and the potentials of the transformer windings are the same in each case.

An important part of the invention is a simple circuit for simulating the output potentials of a synchro transmitter. This circuit is based on the fact that in successive 30° ranges of angular movement of a synchro transmitter the same potential variations are repeated, although they may occur between different pairs of lines, and they change in opposite directions in successive 30° sectors. Therefore, digital transformers providing only as many incremental potential changes as occur in 30° of angular movement need be provided. A digital switching system is then provided for switching the outputs of the digital transformers between different pairs of lines. The reversal of the direction of change at 30° intervals is automatically taken care of by using the reflected binary code, the digital transformers of which deliver potentials that successively incrementally rise and fall through their designed voltage ranges. The complete binary code for use with the system requires four digits for actuating the digital switching system at 30° intervals and additional (less significant) digits for controlling the digital transformers. The number of digits in the less significant group depends upon the fineness of the increments of movement that is required.

A full understanding of the invention may be had from the following detailed description with reference to the drawing, in which.

Figure 5:
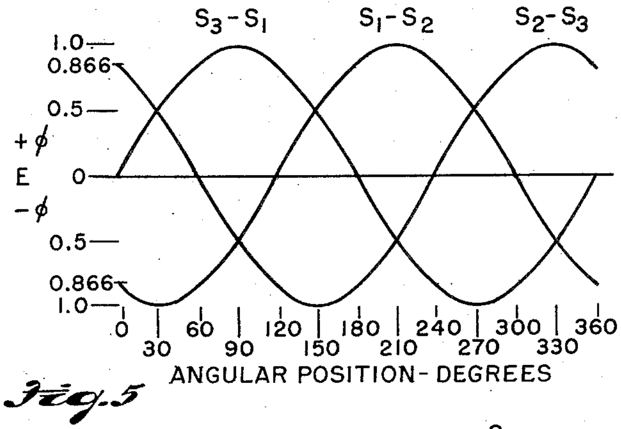
Fig. 5 is a graph showing the potential variations between the three lines of a synchro system in response to movement of the synchro transmitter through different angular positions.
Figure 5A:
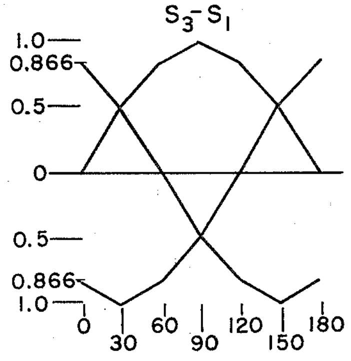

Fig. 5*a* is a diagram similar to Fig. 5 but showing the nature of the potential changes in the output of the digital synchro transmitter.

Figure 6:
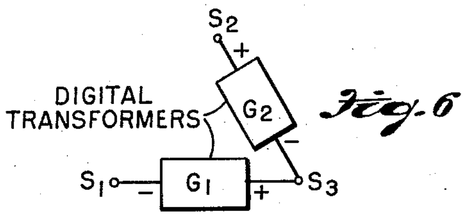

Fig. 6 is a schematic diagram showing a connection of two digital transformers in a digital synchro transmission system.

Figure 7:
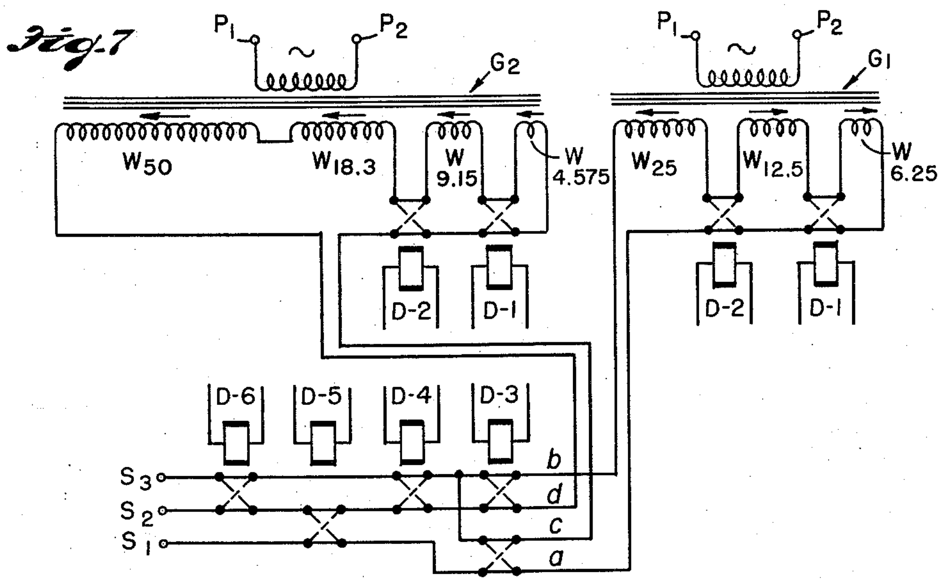

Fig. 7 is a schematic diagram showing a practical digital synchro transmitter circuit.

Figure 8:
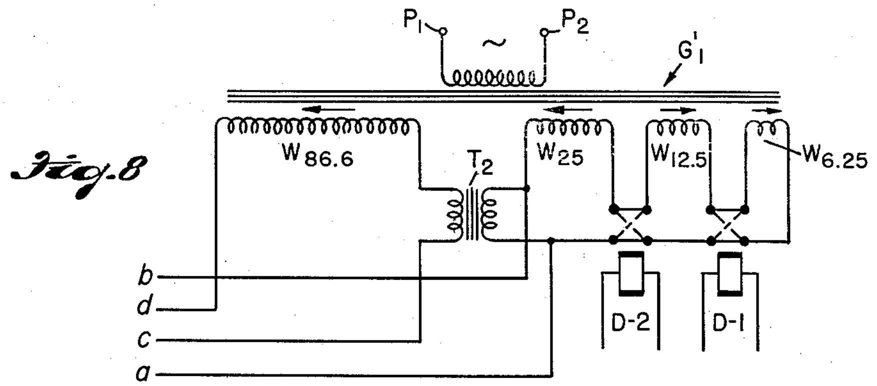

Fig. 8 is a schematic diagram of an alternative circuit that may be substituted for a portion of the circuit of Fig. 7.

Figure 9:
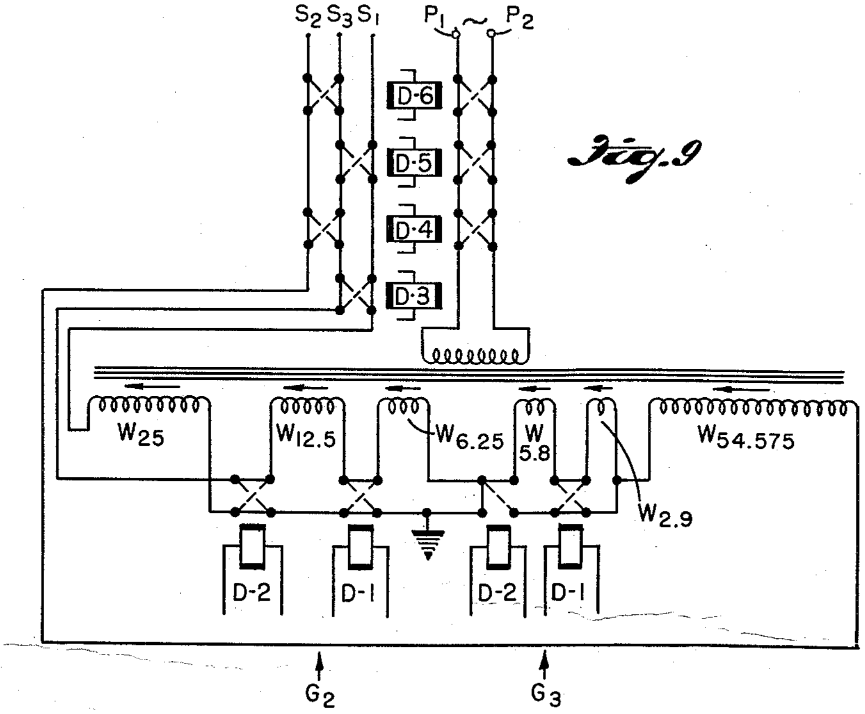

Fig. 9 is a schematic diagram showing still another alternative circuit of a digital synchro transmitter.

Figure 1:
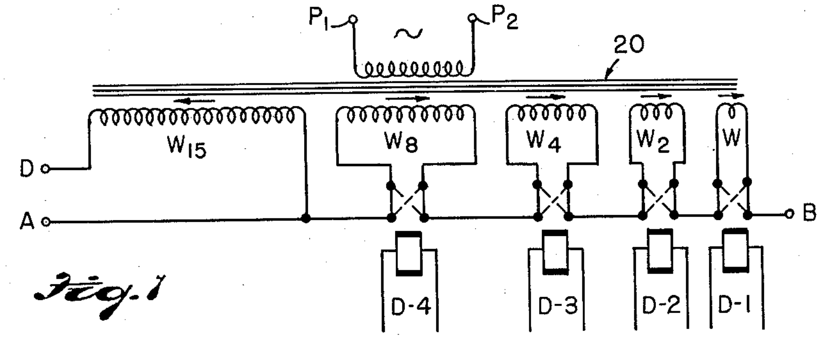
Fig. 1 is a schematic diagram of a digital transformer circuit for use with the additive binary code.
Figure 2:
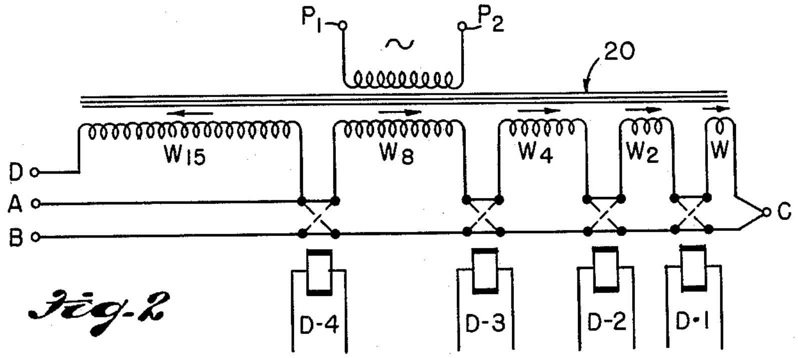
Fig. 2 is a schematic diagram of a digital transformer circuit for use with the reflected binary code.

In both Figs. 1 and 2, a transformer 20 has four secondary windings W, $W_2$, $W_4$ and $W_8$ proportioned to develop potentials of E, 2E, 4E and 8E, respectively, normally connected in series aiding relation. In both figures, four digital switches D–1, D–2, D–3, D–4 are actuated in one or the other of two positions by the respective digit signals of a four-digit binary code, Fig. 1 being designed for the natural or additive code, and Fig. 2 for the reflected code (also variously referred to as the minimum error code and the Gray code). In each figure, the switch connections resulting from a "0" signal are shown in solid lines, and the connections resulting from the "1" signal are shown in dotted lines.

For convenience in discussion of the circuit of Fig. 2, the electrical paths extending from the first main terminal A and from a second main terminal B are sometimes referred to as first and second conductive paths respectively; the windings $W_8$, $W_4$, $W_2$ and W are sometimes referred to as digital potential sources; and the portions of the conductive paths associated with the different windings are referred to as digital sections having first and second input terminals and first and second output terminals. Thus, the first digital section contains the winding $W_8$, the left and right ends of which constitute the first input and first output terminals of that section. The second input and output terminals of the first digital section are the respective left and right ends of the section of the second conductive path extending between the digital switches D–4 and D–3.

The potentials produced between different terminals of the circuits of Figs. 1 and 2 in response to different numbers of 4-digit natural and reflected codes are shown in Table I.

*Table I*

| 1<br>Decimal Number | 2<br>Natural Code | 3<br>Reflected Code | 4<br>$E_{AB}$ | 5<br>$E_{BC}$ | 6<br>$E_{AC}$ | 7<br>$E_{DB}$ |
|---|---|---|---|---|---|---|
| 0 | 0000 | 0000 | +15 | 0 | 15 | 0 |
| 1 | 0001 | 0001 | +13 | 1 | 14 | 2 |
| 2 | 0010 | 0011 | +11 | 2 | 13 | 4 |
| 3 | 0011 | 0010 | +9 | 3 | 12 | 6 |
| 4 | 0100 | 0110 | +7 | 4 | 11 | 8 |
| 5 | 0101 | 0111 | +5 | 5 | 10 | 10 |
| 6 | 0110 | 0101 | +3 | 6 | 9 | 12 |
| 7 | 0111 | 0100 | +1 | 7 | 8 | 14 |
| 8 | 1000 | 1100 | −1 | 8 | 7 | 16 |
| 9 | 1001 | 1101 | −3 | 9 | 6 | 18 |
| 10 | 1010 | 1111 | −5 | 10 | 5 | 20 |
| 11 | 1011 | 1110 | −7 | 11 | 4 | 22 |
| 12 | 1100 | 1010 | −9 | 12 | 3 | 24 |
| 13 | 1101 | 1011 | −11 | 13 | 2 | 26 |
| 14 | 1110 | 1001 | −13 | 14 | 1 | 28 |
| 15 | 1111 | 1000 | −15 | 15 | 0 | 30 |

Table I shows in column 4 the potentials produced between the first main terminal A and the second main terminal B in Fig. 1 in response to all different values of the four-digit natural binary code, and between the first and second main terminals A and B respectively in Fig. 2 in response to the four-digit reflected binary code.

It will be noted that in Fig. 1 actuation of any digital switch simply transposes the connections to the associated transformer winding in the circuit A—B, whereas in Fig. 2 actuation of any digital switch transposes not only its associated winding, but all the windings therebelow; i.e., windings associated with less significant digits. This difference in circuitry causes Fig. 2 to produce the same potentials between its various terminals in response to the reflected code signals in column 3 of Table I that Fig. 1 produces in response to the natural code signals in column 2.

Figure 3:
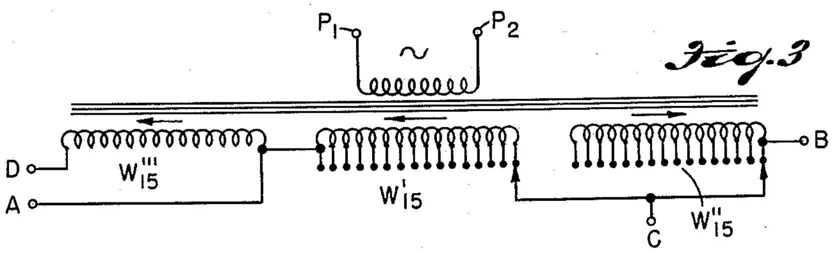
Fig. 3 is a schematic diagram showing the electrical equivalent of the circuit of Fig. 2.

An electrically equivalent circuit is shown in Fig. 3, in which two opposed windings $W_{15}'$ and $W_{15}''$ are each provided with sixteen equally spaced taps, and two interconnected slide contacts (connected to a fourth main terminal C) are movable in unison to simultaneously subtract a portion of one winding and add an equal portion of the other winding. These windings $W_{15}'$ and $W_{15}''$ are oppositely poled, as indicated by the arrows, although all of the windings $W_8$, $W_4$, $W_2$ and W in Figs. 1 and 2 are poled the same. Figs. 1 and 2 accomplish the equivalent effect by rearranging the windings $W_8$, $W_4$, $W_2$ and W having the same total resistance as only one of the windings $W_{15}'$ or $W_{15}''$. If the positions of the slide contacts in Fig. 3 correspond to the decimal numbers in column 1 of Table I, the potentials between the various terminals, A, B, C, D will be the same as the potentials between the corresponding terminals in Fig. 2 when the latter is energized by the reflected code, and will be as shown in columns 4, 5, 6 and 7 of Table I. However, whereas the simple relay circuits of Figs. 1 and 2 respond directly to binary code signals, the sliding contacts of Fig. 3 would have to be actuated by a special mechanism for converting binary code signals into analog movement.

The fourth main terminal C in Fig. 2 is at the same potential as the movable taps connected to terminal C in Fig. 3, and the potential $E_{BC}$ between terminals B and C varies as shown in column 5 of Table I, whereas the potential $E_{AC}$ between terminals A and C varies as shown in column 6 of Table I.

In Figs. 1 and 2, the circuits can be extended to handle digital codes of any number of digits, it being only necessary to preserve the relation that each digital winding have double the potential of the next lower digital winding.

Many variations of the circuit shown in Figs. 1, 2 and 3 are possible. Thus, to the basic digital circuits of Figs. 1 and 2, as so far described, there may be added an extra winding $W_{15}$ connected between terminal A and terminal D in opposing relation to the windings $W_8$, $W_4$, $W_2$ and W. If the potential of $W_{15}$ is equal to the sum of the potentials of $W_8$, $W_4$, $W_2$ and W, the potential $E_{DB}$ will vary as shown in column 7 of Table I.

The winding $W_{15}$ is used only to control the level of the potentials obtained. Thus, referring to column 4 of Table I, the potential obtained at terminals A and B varies in 2-volt increments from 15 volts of positive phase to 15 volts of negative phase. Adding to potential $E_{AB}$ the potential (15 volts of said opposite phase) of winding $W_{15}$ produces the potentials $E_{DB}$ of column 7 which varies by increments of 2 volts from 0 to 30 volts. If winding $W_{15}$ were proportioned to produce 25 volts instead of 15, the values in column 7 would vary from a minimum of 10 volts to a maximum of 40 volts.

The principle of the circuits of Figs. 1, 2 and 3 is utilized in accordance with the invention to provide control potentials for the operation of a synchro receiver A conventional synchro system usually comprises two three-phase A.C. rotary machines having their stator windings connected together by three lines, and their rotors connected to a common A.C. power source. For any angular position of the rotor of one machine (the synchro transmitter), the alternating current in its rotor induces potentials in its stator which, when applied to the stator of the other machine (the synchro receiver), urge its rotor into a particular position relative to that of the synchro transmitter. Conventional synchro systems are well adapted for remote control or indication of angular position over short distances, but are often objectionable for long distance control because of inaccuracies resulting from power losses and phase distortion. On the other hand, it is possible to transmit binary digital code signals economically over great distances without error.

Figure 4:
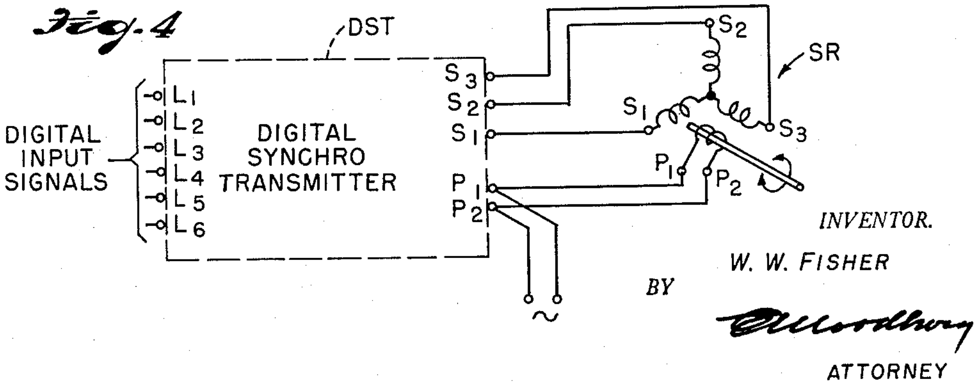
Fig. 4 is a schematic diagram showing a digital synchro transmitter in accordance with the present invention connected to a conventional synchro receiver.

In accordance with this invention, digital binary code signals representing different angular positions can be used to control the generation of three alternating currents which, when applied to the stator of a conventional synchro receiver, cause the rotor thereof to assume the desired angular position. The apparatus for simulating the output of a synchro transmitter in response to digital code signals will herein be designed a digital synchro transmitter, and includes a combination of digital transformers of the general type shown in Figs. 1 and 2 for developing potentials on three output terminals connectible to the three stator terminals of a three-phase synchro receiver. Fig. 4 shows schematically a digital synchro transmitter DST having six digital signal input lines $L_1$, $L_2$, etc., two A.C. input power lines $P_1$ and $P_2$, and three A.C. output lines $S_1$, $S_2$ and $S_3$ connected to the stator of a conventional three-phase synchro receiver SR, the rotor of which is connected to the A.C. power lines $P_1$, $P_2$.

The potentials between each pair of the three stator terminals of a conventional synchro transmitter vary in response to rotation of the rotor through one complete revolution, as shown by the curves of Fig. 5. The ordinate of any point on any curve represents the average or R.M.S. value of the potential for the corresponding angular position of the rotor.

It will be observed from Fig. 5 that in any position the sum of the three potentials is 0. Hence, it is only necessary to generate two of the potentials, the third being the algebraic sum of the first two. This feature can be used to simplify the construction of the digital synchro transmitter, one version of which is shown schematically in Fig. 6, in which one digital generator $G_1$ is connected in delta fashion between lines $S_1$ and $S_3$, and the other generator $G_2$ is connected in delta fashion between lines $S_2$ and $S_3$.

A simplification of the digital generators also results from the fact that during each 30° change in angular position (Fig. 5) each potential changes in one direction or the other between the arithmetic values 0 and 0.5 (sin 0° and sin 30° ); 0.5 and 0.866 (sin 30° and sin 60°); or 0.866 and 1.0 (sin 60° and sin 90°).

Thus, it will be observed that the potential $S_3$–$S_1$ changes from 0 to +0.5 in the first 30° section, and the potential $S_2$–$S_3$ changes from +0.5 to 0 in the second 30° section; the potential $S_2$–$S_3$ changes from +0.866 to +0.5 in the first 30° section, and the potential $S_3$–$S_1$ changes from +0.5 to +0.866 in the second 30° section; and the potential $S_1$–$S_2$ changes from —0.866 to —1.0 in the first 30° section, and from —1.0 to—0.866 in the second 30° section.

Referring back to Fig. 6, assume that digital transformer $G_1$ generates a potential varying from 0 to +0.5, and digital transformer $G_2$ generates a potential varying from +0.866 to +0.5, the third voltage $S_1$–$S_2$, being the sum of the other two, will vary from —0.866 to—1.0. This takes care of the first 30° of angular movement. Each succeeding 30° of angular movement can be handled by switching the generators $G_1$ and $G_2$ into different relations with the lines $S_1$, $S_2$ and $S_3$. Thus, between the 30° and 60° angular positions, generator $G_1$ is inserted between $S_2$ and $S_3$, and generator $G_2$ is inserted between $S_3$ and $S_1$, and so on through the twelve 30° sections making up a complete revolution.

Further in accordance with the invention, the switching is accomplished by digital signals additional to those controlling the digital generators $G_1$ and $G_2$. Four digits (having sixteen possible combinations) will provide the twelve different switching codes. The number of digits used to control the digital generators $G_1$ and $G_2$ depends upon the minuteness of angular increments of movement required. Two digits provide four increments in each sector, or 7.5° between successive positions. Four digits would provide sixteen increments in each 30° sector, or slightly less than 2° angular movement between successive positions, and suffice for many applications, under which condition the total number of digits required in the code would be eight.

Referring to Fig. 7, there is shown schematically a complete 6-digit digital synchro transmitter involving two digital transformers $G_1$ and $G_2$, each in general accordance with Fig. 2 and associated with the synchro output lines $S_1$, $S_2$, $S_3$ by a digital switching system comprising four digital transposing switches D–3, D–4, D–5, D–6 controlled by the four most significant digits of a 6-digit code. The two least significant digits control the digital relays of the 2-digit digital generators $G_1$ nd $G_2$.

The simple digital transformers provide an output that varies linearly, whereas the output of a conventional synchro transmitter varies as the sin of the rotor angle. Therefore, the output of the digital synchro transmitter corresponds exactly to the output of a conventional synchro transmitter only at twelve points spaced 30° apart, and is linear between those points, all as shown by the curves in Fig. 5*a*. This introduces a maximum error in the position of the synchro receiver of approximately 0.15°, or 0.04%.

The operation of the circuit of Fig. 7 is shown in Table II.

*Table II*

| 1<br>Position No. | 2<br>Position, Angular, degrees | 3<br>Reflected Code $d_6d_5d_4d_3d_2d_1$ | 4<br>$S_3$–$S_1$ | 5<br>$S_2$–$S_3$ | 6<br>$S_1$–$S_2$ |
|---|---|---|---|---|---|
| 0 | 3.75 | 0 0 0 0 0 0 | 6.25 | 82.025 | −88.275 |
| 1 | 11.25 | 0 0 0 0 0 1 | 18.75 | 72.875 | −91.625 |
| 2 | 18.75 | 0 0 0 0 1 1 | 31.25 | 63.725 | −94.975 |
| 3 | 26.25 | 0 0 0 0 1 0 | 43.75 | 54.575 | −98.325 |
| 4 | 33.75 | 0 0 0 1 1 0 | 54.575 | 43.75 | −98.325 |
| 5 | 41.25 | 0 0 0 1 1 1 | 63.725 | 31.25 | −94.975 |
| 6 | 48.75 | 0 0 0 1 0 1 | 72.875 | 18.75 | −91.625 |
| 7 | 56.25 | 0 0 0 1 0 0 | 82.025 | 6.25 | −88.275 |
| 8 | 63.75 | 0 0 1 1 0 0 | 88.275 | −6.25 | −82.025 |
| 11 | 86.25 | 0 0 1 1 1 0 | 98.325 | −43.75 | −54.575 |
| 15 | 116.25 | 0 0 1 0 0 0 | 88.275 | −82.025 | −6.25 |
| 19 | 146.25 | 0 1 1 0 1 0 | 54.575 | −98.325 | 43.75 |
| 23 | 176.25 | 0 1 1 1 0 0 | 6.25 | −88.275 | 82.025 |
| 27 | 206.25 | 0 1 0 1 1 0 | −43.75 | −54.575 | 98.325 |
| 31 | 236.25 | 0 1 0 0 0 0 | −82.025 | −6.25 | 88.275 |
| 35 | 266.25 | 1 1 0 0 1 0 | −98.325 | 43.75 | 54.575 |
| 39 | 296.25 | 1 1 0 1 0 0 | −98.325 | 82.025 | 6.25 |
| 43 | 326.25 | 1 1 1 1 1 0 | −54.575 | 98.325 | −43.75 |
| 47 | 356.25 | 1 1 1 0 0 0 | −6.25 | 88.275 | −82.025 |
| 3 | 26.25 | 1 0 1 0 1 0 | 43.75 | 54.575 | −98.325 |
| 7 | 56.25 | 1 0 1 1 0 0 | 82.025 | 6.25 | −88.275 |
| 11 | 86.25 | 1 0 0 1 1 0 | 98.325 | −43.75 | −54.575 |
| 15 | 116.25 | 1 0 0 0 0 0 | 88.275 | −82.025 | −6.25 |

It will be noted that the starting position (column 1 in Table II) is 3.75° (column 2) when all the code digits (column 3) are "0." The two digits $d_1d_2$ provide four combinations in each 30° sector which yields 7.5° increments. However, it will be observed that digits $d_1d_2$ do not change between positions 3, 4; 7, 8, etc. at the 30° points (Fig. 5). Hence, the first and last of the four positions in each 30° section are spaced half an increment (3.75°) from the ends of the section. Therefore, actuation of one of the digital switches D–3, D–4, D–5, D–6 at each 30° point to shift the connections of the digital generators $G_1$ and $G_2$ to the lines $S_1$, $S_2$, $S_3$ automatically produces a shift of one increment (7.5°).

In position "0" the switch connections are as shown in full lines in Fig. 7, and lines $S_3$ and $S_1$ are connected to generator $G_1$, which delivers 6.25 volts (⅛ of the potential change of 50 volts between lines $S_3$ and $S_1$ in the first 30° of movement). Lines $S_2$ and $S_3$ are connected to generator $G_2$ which delivers 82.025 volts (86.6 volts minus ⅛ of the potential change of 36.6 volts in the first 30° of movement). The potential between lines $S_1$ and $S_2$ is the sum (88.275 volts) of the other two potentials.

In position 1, the digital switches D–1 in generators $G_1$ and $G_2$ are actuated to increase the output of digital generator $G_1$ one increment of 12.5 volts to 18.75 volts and reduce the output of digital generator $G_2$ one increment of 9.15 volts to 72.875 volts.

In position 2, digital switches D–2 are actuated to increase the output of digital generator $G_1$ another increment of 12.5 volts to 31.25 volts, and reduce the output of digital generator $G_2$ another increment of 9.15 volts to 63.725 volts.

In position 3, digital switches D–1 are restored to their normal position to increase the output of digital generator $G_1$ still another increment of 12.5 volts to 43.75 volts and reduce the output of digital generator $G_2$ another increment of 9.15 volts to 54.575 volts.

In position 4, the outputs of the digital generators $G_1$ and $G_2$ are not changed. The switch D–3 is actuated to connect lines $S_3$ and $S_1$ to generator $G_2$, and lines $S_3$ and $S_2$ to generator $G_1$, which automatically increases the potential between lines $S_3$ and $S_1$ to 54.575 volts and reduces the potential between lines $S_2$ and $S_3$ to 43.75 volts.

In positions 5, 6 and 7, switches D–1 and D–2 are operated in reverse or reflected order to increase the potential between lines $S_3$ and $S_1$ to 82.025 volts and decrease the potential between lines $S_2$ and $S_3$ to 6.25 volts.

In position 8, digital switch D–4 operates to: (1) disconnect generator $G_2$ from lines $S_3$ and $S_1$ and connect it to lines $S_1$ and $S_2$; and (2) transpose the connections from generator $G_1$ to lines $S_2$ and $S_3$. The outputs of the generators $G_1$ and $G_2$ are therefore applied directly to the lines $S_2$–$S_3$ and $S_1$–$S_2$, respectively, and the potential between lines $S_3$ and $S_1$ is the sum of the potentials between the other two pairs.

The operation through the remainder of the cycle and through four sections of a new cycle is shown only at 30° intervals in Table II to simplify the table. The last four sections of the code in column 3 produce the same switching effects as the last positions in the first four sections (positions 3, 7, 11 and 15, respectively), and would produce discontinuity if used. Therefore, in practice only 48 of the 64 possible code combinations are used. The last 16 may be dropped, so that the starting code 000000 follows the code 111000 of position 47. Preferably, however, the first eight numbers and the last eight numbers are dropped, so that the code starts with the number 001100 of position 8 and ends with the code 101100 of position 7, thereby preserving the minimum error advantages of the reflected code.

It is to be understood that the system of Fig. 7 is shown with generators $G_1$ and $G_2$ responsive to only a 2-digit code, solely for the purpose of simplifying Table II. Any desired number of digital sections may be added to the generators $G_1$ and $G_2$, depending upon the degree of definition that is desired, the rules for adding sections being set forth previously in connection with the description of Fig. 2.

Various specific circuits other than that shown in Fig. 7 may be employed in practicing the invention. As examples, the circuits of Figs. 8 and 9 are shown.

Fig. 8 shows a modification of a portion of Fig. 7 in which there has been substituted a winding $W_{86.6}$ and an auxiliary transformer $T_2$ in place of the windings $W_{50}$, $W_{18.3}$, $W_{9.15}$, $W_{4.575}$ and their associated digital switches D–2, D–1. Transformer $T_2$ has a primary winding connected to the output of digital generator $G_1'$, and a secondary winding connected in series opposing relation with winding $W_{86.6}$ between the switch terminals *c* and *d*. Transformer $T_2$ is a step-down transformer having a voltage ratio of 0.732 so that the output voltages 6.25, 18.75, 31.25 and 43.75, respectively, of $G_1'$ generate in the secondary winding of $T_2$ voltages of 4.575, 13.725, 22.875 and 32.025, respectively. When these voltages are subtracted from the voltage 86.6 of winding $W_{86.6}$, the resulant output potentials are the same as those delivered by the digital generator $G_2$ in Fig. 7; namely, 82.025, 72.875, 63.725 and 54.575 (see column 5 of Table II).

The circuits of Figs. 6, 7 and 8 involve circuits in which separate digital generators are independently connectable between different pairs of the three lines $S_1$, $S_2$ and $S_3$.

Fig. 9 shows a circuit involving a different mode of connection for producing the same end results. In the starting position, a digital generator $G_3$ applies a potential of −63.275 between ground and line $S_2$; windings $W_{6.25}$ and $W_{12.5}$ of a digital generator $G_2$ apply a potential of 18.75 between ground and line $S_3$; and a winding $W_{25}$ of digital generator $G_2$ applies a potential of 25 volts between ground and line $S_1$. These potentials of the individual conductors $S_1$, $S_2$, $S_3$ with respect to ground produce the voltages between the conductors shown in columns 4, 5 and 6 for position 0 in Table II. As the digital relays D–1 to D–6 are actuated in response to the different codes in column 3, the potentials change as shown in the table. In the system of Fig. 9, it will be noted that the digital switches D–4, D–5, D–6 have transposing contacts in the power supply line to the primary winding of the digital transformer, in addition to the transposing contacts in the lines $S_1$, $S_2$, $S_3$. This is necessary to maintain the proper phase relations in all positions.

The preceding paragraph, for convenience of explanation, describes the potentials that are produced between a common reference point (shown as ground) and each of the three lines $S_1$, $S_2$, $S_3$. However, the connection to ground has no significance, and the operation of the circuit may also be explained as follows:

In the starting position, there are connected in series relation between lines $S_3$–$S_1$ windings $W_{12.5}$, $W_{6.25}$, $W_{25}$, producing a potential of 6.25 between lines $S_3$–$S_1$. Connected in series relation between lines $S_1$–$S_2$ are windings $W_{25}$, $W_{5.8}$, $W_{2.9}$, and $W_{54.575}$, producing a potential of −88.275. Connected in series relation between lines $S_2$–$S_3$ are windings $W_{54.575}$, $W_{2.9}$, $W_{5.8}$, $W_{6.25}$, and $W_{12.5}$ producing a potential of 82.025. These are the potentials shown in position No. 0 of Table II.

In the circuit of Fig. 9, the windings are of potentials to provide maximum potentials of 100 volts between the lines $S_1$, $S_2$, $S_3$ in a 2-digit system. The potentials of the various windings for a system employing any number of digits may be computed as follows.

The potential of winding $W_{25}$ is $$\frac{E \sin 30°}{2}$$

where E is the maximum potential to be produced between each pair of the lines $S_1$, $S_2$, $S_3$. The highest digital winding ($W_{12.5}$ in Fig. 9) produces half the potential of winding $W_{25}$, and each successive digital winding thereafter produces half the potential of the next higher winding.

In digital transformer $G_3$ the potential of the highest digital winding ($W_{5.8}$) is $$\frac{E \sin 60° - \sin 30° - \frac{\sin 30°}{2}}{2}$$

and each successive lower digital winding produces a potential half that of the next higher winding. The potential of the winding $W_{54.575}$ is $$E \sin 30° + \frac{E_n}{2} + \frac{E_n'}{2}$$

where $E_n$ is the potential of the smallest digital winding of generator $G_2$ and $E_n'$ is the potential of the smallest digital winding of generator $G_3$.

Although for the purpose of explaining the invention a particular embodiment thereof has been shown and described, obvious modifications will occur to a person skilled in the art, and I do not desire to be limited to the exact details shown and described.

I claim:

1. Apparatus for translating binary code multidigit signals into corresponding potential values between first and second main terminals comprising: a plurality of digital potential sources corresponding to the different digits of said signal, each source having twice the potential of the next lower digital source; a digital switch for each digital source operable by its corresponding digit signal into first and second positions, respectively, according to the binary value of the digit signal; circuit means including said switches connecting said sources in series with each other between said first and second main terminals, each digital switch connecting its associated source in said series circuit in one polar relation in response to one binary digital value, and in the opposite polar relation in response to the other binary digital value.

2. Apparatus for simulating the output potentials of a synchro transmitter at angular positions spaced 30° apart comprising: three terminals; first and second sources of potential having values in the ratio of any two of the values 0.5, 0.866, and 1.0; and switching means for selectively connecting each source to any one of said terminals in either polarity.

3. Apparatus according to claim 2 in which said switching means comprises a digital switch responsive to four-digit binary code providing twelve different connections corresponding to the twelve different combinations of two potentials on the three conductors of a synchro transmitter at positions spaced 30° apart.

4. Apparatus for translating binary code multidigit signals into corresponding potential values between first and second main terminals comprising: a plurality of digital potential sources corresponding to the different digits of said signal, each source having twice the potential of the next lower digital source; a digital switch for each digital source operable by its corresponding digit signal into first and second positions, respectively, according to the binary value of the digit signals; and circuit means including said switches connecting said sources in series with each other between said first and second main terminals; each digital switch reversing the polarity of at least its associated source with respect to said first and second terminals in response to a change in the position of the switch.

5. Apparatus according to claim 4 for translating reflected code signals in which said circuit means, digital sources and digital switches define first and second conductive paths extending from said first and second main terminals, respectively, and interconnected at their remote ends, said conductive paths being divided into a plurality of digital sections arranged in descending order from said terminals; each digital section comprising first input and output terminals interconnected by the associated digital source, and second input and output terminals connected together; each digital switch consisting of a transposing switch at the input end of its associated digital section for selectively connecting the first and second input terminals of its section to the portion of the conductive path thereahead in direct or transposed relation according to the binary value of the associated digit signal.

6. Apparatus according to claim 4 including a third main terminal and an auxiliary potential source connected between said first and third main terminals.

7. Apparatus according to claim 6 in which the potential of said auxiliary source is at least equal to the sum potential of said digital sources.

8. Apparatus according to claim 4 for translating reflected code signals in which said circuit means, digital sources and digital switches define first and second conductive paths extending from said first and second main terminals, respectively, and interconnected at their remote ends, with said digital sources and switches in descending order from said main terminals; each digital switch comprising a transposing switch for transposing said first and second paths ahead of its associated digital source.

9. Apparatus for simulating the output potentials of a synchro transmitter comprising: three terminals; first and second digital apparatuses according to claim 8, both responsive to a first group of consecutive digits including the least significant digit of a multidigit reflected binary code signal; said first digital apparatus having potential sources of magnitudes producing incremental output potentials within one of the three relative ranges 0 to 0.5, 0.5 to 0.866, and 0.866 to 1; said second digital apparatus having potential sources of magnitude producing incremental output potentials within another of said three relative ranges, whereby during successive cycles of change of said digits in opposite direction in accordance with the reflected code, the outputs of said first and second apparatuses vary through their respective ranges in opposite directions; and digital switching means responsive to a second group of consecutive digits of said code signal next adjacent said first group for selectively connecting said first and second digital apparatuses to different ones of said three terminals.

10. Apparatus according to claim 9 in which said switching means is responsive to each successive change in said second group of digits to change the connection of at least one of said digital apparatuses to said terminals.

11. Apparatus according to claim 10 in which each said digital apparatus produces digital incremental potential changes equal to $$\frac{R}{2^n}$$

where R is the associated potential range and $n$ is the number of digits in said first group, and the lowest and highest potentials are one-half increment above and below the lower and upper limits, respectively, of the associated potential range.

References Cited in the file of this patent

UNITED STATES PATENTS

| | | |
|---|---|---|
| 2,369,474 | Luhn | Feb. 13, 1945 |
| 2,453,454 | Norwine | Nov. 9, 1948 |
| 2,625,822 | Nichols | Jan. 20, 1953 |
| 2,630,562 | Johnson | Mar. 3, 1953 |
| 2,685,084 | Lippel | July 27, 1954 |
| 2,738,504 | Gray | Mar. 13, 1956 |
| 2,808,547 | Adler | Oct. 1, 1957 |

FOREIGN PATENTS

| | | |
|---|---|---|
| 731,650 | Great Britain | June 8, 1955 |

UNITED STATES PATENT OFFICE
CERTIFICATE OF CORRECTION

Patent No. 2,969,534 January 24, 1961

Walter W. Fisher

It is hereby certified that error appears in the above numbered patent requiring correction and that the said Letters Patent should read as corrected below.

Column 4, lines 37 and 38, 64 and 69, strike out "three-phrase", each occurrence; column 5, line 10, strike out "in delta fashion"; line 11, strike out "is connected in delta fashion".

Signed and sealed this 21st day of November 1961.

(SEAL)
Attest:

ERNEST W. SWIDER
Attesting Officer

DAVID L. LADD
Commissioner of Patents

USCOMM-DC